United States Patent

[11] 3,573,579

[72] Inventor Alexander J. Lewus
 9230 N. 14th Ave., Phoenix, Ariz. 85021
[21] Appl. No. 4,562
[22] Filed Jan. 21, 1970
[45] Patented Apr. 6, 1971
 Continuation-in-part of application Ser. No. 362,764, Apr. 27, 1964, now abandoned,
 Continuation-in-part of application Ser. No. 666,269, Sept. 8, 1967, now abandoned.

[54] SINGLE-PHASE MOTOR CONTROLS USING UNITARY SIGNAL-CONTROLLED BI-DIRECTIONAL SEMICONDUCTOR GATE DEVICES
 15 Claims, 8 Drawing Figs.
[52] U.S. Cl....................................................... 318/221, 318/227
[51] Int. Cl...................................................... H02p 1/44
[50] Field of Search........................................... 318/220, 221, 221.6, 227; 321/45 (DT)

[56] References Cited
UNITED STATES PATENTS
3,071,717 1/1963 Gordon .......................... 318/221
3,226,620 12/1965 Elliot et al. .................... 318/221

FOREIGN PATENTS
945,249 12/1963 Great Britain ................ 317/28

Primary Examiner—Oris L. Rader
Assistant Examiner—Gene Z. Rubinson
Attorney—Kinzer, Dorn and Zickert ABSTRACT: External control circuits for single-phase electric motors of the split-phase, capacitor-start inductance-run, and capacitor-start capacitor-run kinds in which the starting winding is connected to a power supply through a series circuit including a single unitary signal-controlled bidirectional gate device or by a plurality of such devices triggered from a common sensing means. In each circuit, the sensing means is connected in series with the power circuit for the main or running winding of the motor; the sensing means may be an adjustable series resistor or inductance or an air gap sensing transformer having an adjustable magnetic core with the primary winding of the transformer in series in the main winding circuit. The trigger or gate electrode of the gate device, referred to commercially as a triac or a quadrac, is connected to the sensing means to gate the device on for motor currents above a given threshold and to gate the device off for motor currents below a threshold value, the threshold levels being determined by adjustment of the sensing device.

Patented April 6, 1971

Inventor
ALEXANDER J. LEWUS
By Kinzer, Dorn and Zickert
Attorneys

Patented April 6, 1971  3,573,579

Inventor
ALEXANDER J. LEWUS
By Kinzer, Dorn and Zickert
Attorneys

Inventor
ALEXANDER J. LEWUS
By Kinzer, Dorn and Zickert
Attorneys 3,573,579

SINGLE-PHASE MOTOR CONTROLS USING UNITARY SIGNAL-CONTROLLED BI-DIRECTIONAL SEMICONDUCTOR GATE DEVICES

CROSS REFERENCE TO RELATED APPLICATIONS

This application is a continuation-in-part of application Ser. No. 362,764 filed Apr. 27, 1964, and of application Ser. No. 666,269 filed Sept. 8, 1967, both now abandoned.

BACKGROUND OF THE INVENTION

This invention relates to single-phase motors and more particularly to controls for the starting windings of single-phase electric motors of the split-phase, capacitor-start capacitor-run and capacitor-start inductance-run kinds.

Single-phase electric motors are conventionally provided with two windings, mounted in a stator core, inductively coupled to the rotor of the motor. These two windings, constituting a starting winding and a running winding, are angularly displaced from each other, within the stator core, the construction being such that the starting winding is supplied with a leading current that is displaced by 60° or more electrically with respect to the lagging current in the main winding of the motor. The starting winding is used primarily for starting of the motor. Most frequently, a centrifugally operated switch driven by the motor shaft is used to disconnect the starting winding after the motor has reached a given speed. In some motors, the starting winding may remain coupled to the power supply through a fixed running capacitor.

In the operation of conventional single-phase electric motors, whether of the capacitor-start inductance-run, capacitor-start capacitor-run, or split-phase types, one of the most frequent sources of malfunction is the centrifugal switch or other switching device used to disconnect the starting winding from the electrical circuit when the motor is running. If the motor is started and stopped quite frequently, the switch or relay contacts may arc excessively and may deteriorate to a point where the motor will not function properly even though the motor structure itself is good for a much longer life. The switch or relay also may accumulate dust, dirt, and other materials and may eventually jam, preventing effective starting or tending to maintain the starting winding of the motor in circuit after it should be disconnected. In the latter circumstance, the motor may overheat, substantially reducing the life of the motor. Furthermore, the conventional control arrangements for single-phase motors frequently produce substantial difficulties with respect to reversing the direction of rotation of the motor, particularly when the direction of rotation is reversed under load conditions.

Throughout this specification, and in the appended claims, the expression "capacitor-start motor" includes both capacitor-start capacitor-run motors and capacitor-start inductance-run motors.

There have been proposals for the use of signal-controlled rectifiers in the starting circuits of single-phase electric motors in place of conventional starting switches. Thus, in U.S. Pat. No. 3,116,445, two sensing windings are inductively coupled to the main winding of a capacitor-start inductance-run motor, the outputs from the sensing windings being used to trigger two SCRs connected in back-to-back relation in series in the starting winding circuit of the motor. And similar circuits, each using a separate sensing transformer having a primary winding connected in the main motor winding circuit, are shown in U.S. Pat. Nos. 3,226,620 and 3,071,717. But the circuits proposed in those patents present substantial difficulties with respect to maintenance of adequate sensitivity and accuracy of operation, primarily due to the utilization of substantial resistance, or capacitance, or both in the triggering circuits for the SCRs. Moreover, these known circuits, in which the firing levels of the SCRs are controlled by added impedances in their trigger circuits, tend to afford relatively low-starting torques in operation of the motors.

SUMMARY OF THE INVENTION

It is an object of the present invention, therefore, to provide a new and improved control circuit for single-phase electric motors, including motors of the split-phase and capacitor-start types, that effectively and inherently eliminates or minimizes the difficulties and disadvantages of previously known circuits.

A specific object of the invention is to provide a new and improved control circuit for a single-phase electric motor of the capacitor-start or split-phase type that requires no mechanical switching device and that eliminates entirely any switching contacts, thereby precluding maintenance difficulties due to contact arcing and to fouling or other failure of a switch, yet provides improved torque characteristics in operation of the motor.

Another object of the invention is to provide improved speed of response in a control circuit for a single-phase electric motor by employing therein a single, unitary solid-state semiconductor switching device having no mechanical inertia in its operation.

A specific object of the invention is to provide a new and improved switching control circuit for the starting winding of a single-phase electric motor, using a single unitary solid-state gate device, that permits practical reversing operating under load conditions.

An additional object of the invention is to afford a control circuit for a single-phase electric motor, in which the principal control element is a bidirectionally conductive signal-controlled semiconductor gate device, that is usable for motors having a broad range of operating speeds and operable at different line voltages without requiring any fundamental change in the control circuit with respect to changes in operating voltage or speed.

An additional object of the invention is to provide a new and improved control circuit for single-phase electric motor of the capacitor-start or split-phase kind that affords improved efficiency and higher pull-in and breakdown torques than more conventional control arrangements.

A particular object of the invention is to afford a new and improved control circuit for the starting winding of a single-phase dual-voltage electric motor that requires no mechanical or electrical connection to the motor other than a direct electrical connection to the starting winding itself.

Accordingly, the invention is directed to a control circuit for a single-phase electric motor including a main winding and a starting winding that are angularly displaced from each other in a stator core, the two windings being inductively coupled to the rotor of the motor. The control circuit of the invention comprises power circuit means for connecting the main winding to a single-phase power supply, together with sensing means coupled to the power circuit means for developing a control signal that is proportional to the load current in the main winding of the motor. The control circuit further includes starting circuit means for connecting the starting winding of the motor to the power supply. This starting circuit means includes a unitary signal-controlled bidirectionally conductive semiconductor gate device having input and output electrodes connected in series in the starting circuit and having a gate electrode directly conductively connected to the sensing means and being effective to close the starting circuit, in response to the aforementioned control signal, whenever the load current to the main winding of the motor exceeds a first threshold amplitude. The gate device is also effective to open the starting circuit whenever the load current falls below a second threshold amplitude; the two threshold amplitudes may be equal to each other but need not be equal.

Other further objects of the present invention will be apparent Other and the following description and claims and are illustrated in the accompanying drawings which, by way of illustration, show preferred embodiments of the present invention and the principles thereof and what is now considered to be the best mode contemplated for applying these principles.

Other embodiments of the invention embodying the same or equivalent principles may be made as desired by those skilled in the art without departing from the present invention.

DESCRIPTION OF THE PREFERRED EMBODIMENTS

Figure 1:
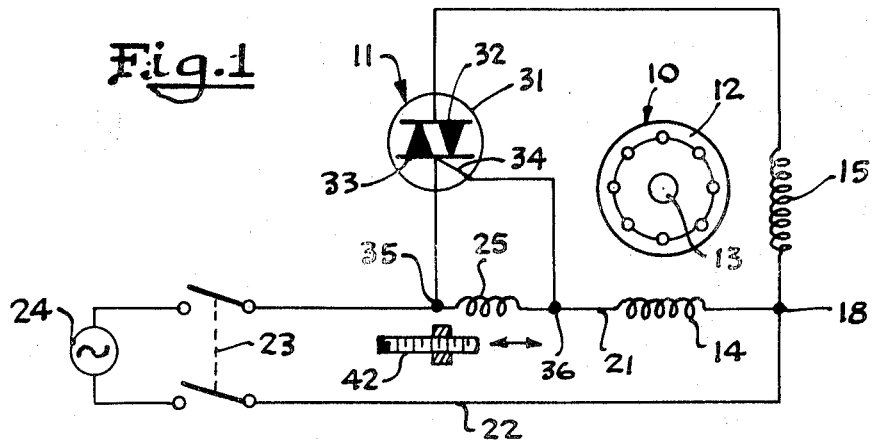
FIG. 1 is a schematic diagram of a single-phase single-voltage split-phase motor connected in a control circuit constructed in accordance with one embodiment of the present invention.

FIG. 1 illustrates, in schematic form, a split-phase motor 10 of conventional construction connected in a control circuit 11 comprising one embodiment of the present invention. The motor 10 includes the usual armature 12, which may be of the wound rotor type or may comprise a conventional squirrel-cage rotor. The particular construction employed for the rotor, which may be a high resistance or a low resistance type, is not critical to the present invention. For example, armature 12 may be constructed with individually wound wire coils mounted in slots in the usual laminated core structure; it may equally well comprise die cast conductors instead of the wire coils. Armature 12 is, of course, mounted on the usual motor shaft 13.

Motor 10 further includes the usual field windings comprising a main or running winding 14 and a starting winding 15. The two windings are connected together at terminal 18.

The main winding 14 of motor 10 is connected, by power circuit means comprising a pair of conductors 21 and 22 and a starting switch 23, to a single-phase power supply 24. Power supply 24 represents any conventional AC power supply. Starting switch 23 is shown as a conventional double-pole single-throw motor starting switch. Of course, the power circuit for the main winding of the motor may include suitable overload protection; moreover, the manually operable switch 23 may be replaced by a suitable electrically operated contactor or other conventional motor starting switch if desired.

The control circuit 11 illustrated in FIG. 1 comprises a sensing device 25 comprising an inductance coil connected in series in the conductor 21 that connects the AC supply 24 to the main running winding 14. The sensing device 25 is utilized to develop a control signal that is proportional to the current amplitude in power line 21 and hence representative of the load current drawn by the main winding 14 of motor 10. Device 25 is shown as an air core inductance coil but is provided with a ferrite or other magnetic core 42 that may be advanced into or retracted from the coil to vary the total inductance.

The principal control element in circuit 11 is a triac 31 having input and output electrodes 32 and 33 and a gate or trigger electrode 34. A triac is a three-electrode AC semiconductor switch which is triggered into conduction by a gate signal in a manner somewhat similar to the action of a signal-controlled rectifier, but differs from the usual signal-controlled rectifier because it can conduct in both directions of current flow in response to either a positive or a negative gate signal. In these devices, recently introduced on a commercial basis, the region between the input and output electrodes 32 and 33 may constitute, essentially, a PNPN switch in parallel with an NPNP switch. Similar devices are also referred to commercially as "quadracs." Both of the input and output electrodes 32 and 33 function as cathodes and anodes and the devices can be triggered to conductive state by a control voltage of sufficient amplitude, regardless of polarity, across the gate electrode 34 and electrode 33.

In control circuit 11, electrode 33 is connected to conductor 21 in the power supply circuit for motor 10, at a terminal 35 between sensing means 25 and power switch 23. The other terminal 36 of sensing inductance 25 is connected to the gate or trigger electrode 34. The connections of electrodes 33 and 34 to terminals 35 and 36 can be reversed without changing the operating characteristics of the circuit.

The AC gated bidirectionally conductive semiconductor rectifier 31 affords quite desirable operating characteristics insofar as the control circuit of the present invention is concerned. When conducting, the device exhibits a very low-voltage drop and high current-carrying capacity.

To start motor 10, switch 23 is closed, connecting main winding 14 in series across the AC supply 24. The initial inrush of starting current through the sensing inductance 25 develops a control signal, constituting a voltage drop across terminals 35,36, that is of sufficient amplitude to trigger the gate device 31 to conduction. It is thus seen that starting winding 15 is effectively connected in a complete starting circuit, through the bidirectional signal-controlled rectifier 31, to the same power supply that energizes the main or running winding 14 of the motor.

As motor 10 builds up in emf and approaches running speed, the current drawn by running winding 14 progressively reduces. When the current through coil 25, in the main motor power circuit, drops below a given threshold value, the amplitude of the control voltage across terminals 35 and 36, as applied to electrodes 33 and 34, is no longer sufficient to trigger the rectifier 31 to conduction. Since the current in the main discharge path of the device 31 goes to zero in each cycle of the supply current, the triac or quadrac ceases.

During continuing operation of the motor, if excessive load conditions are encountered the current in the main power circuit 21,22 for main winding 14 may again become high enough to develop a control voltage across the terminals 35 and 36 of sensing means 25 having an amplitude sufficient to again trigger gate device 31 to conductive condition. When this occurs, starting winding 15 is again connected in the circuit until such time as the load current through the running winding drops below the threshold amplitude required for the sensing inductance 25 to trigger the gate device 31. In the latter circumstance, the motor again operates with only running winding 14 energized.

The speed of response of control circuit 11 is greatly improved as compared with mechanical switching devices, such as centrifugally actuated starting switches, since the bidirectional signal-controlled rectifier 31 has no mechanical inertia and the electrical inertia is so low as to be negligible in motor applications. There are no switch contacts to arc and pit and the control circuit cannot fail due to fouling of a switch contact or mechanism by dirt, dust or other foreign matter. The circuit affords improved efficiency with respect to breakdown and starting torques. Furthermore, a conventional reversing switch, effective to reverse the lead connections to either main winding 14 or starting winding 15, can be readily incorporated in the circuit to permit reversal of rotation under load without adversely affecting in any way the operation of the control circuit.

Figure 2:
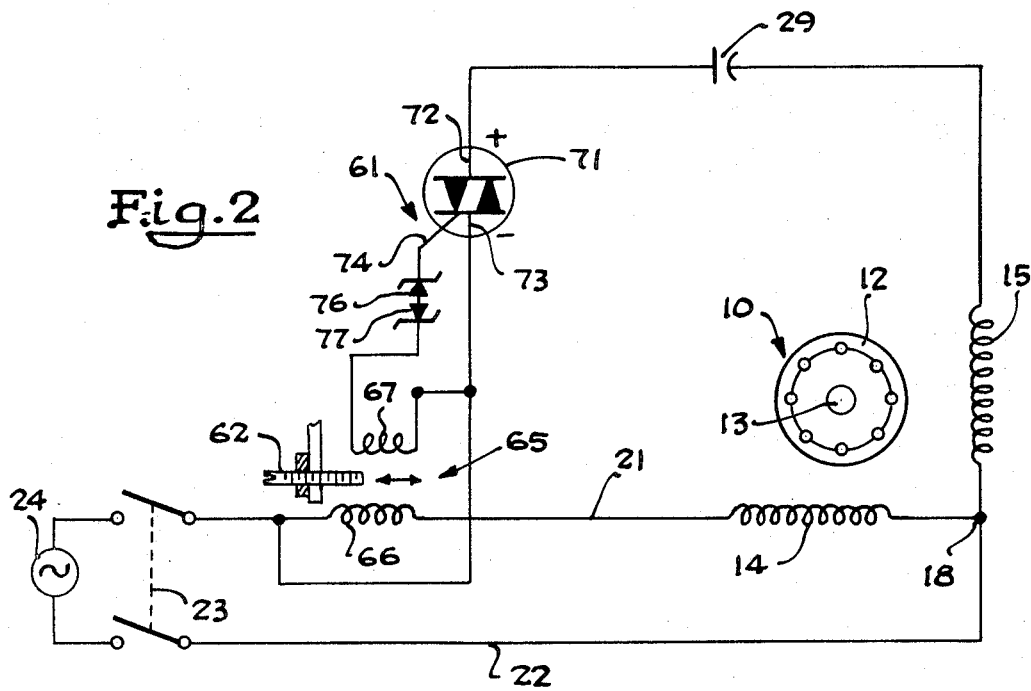
FIG. 2 is a schematic diagram of a capacitor-start inductance-run motor connected in a control circuit constructed in accordance with another embodiment of the present invention.

FIG. 2 illustrates another form of control circuit 61 applied to the control of a capacitor-start inductance-run motor 10 that comprises the usual armature 12 inductively coupled to a starting winding 15 and a single-voltage running winding 14. The power circuit connections for running winding 14 are the same as before, comprising the power conductors 21 and 22 connected through a starting switch 23 to a suitable AC supply 24. As before, starting winding 15 is connected to running winding 14 at terminal 18. An intermittent duty capacitor 29 is connected to the other end of the starting winding.

Control circuit 61 is provided with an air core sensing transformer 65 that includes a primary winding 66 connected in series in the power conductor 21 for the main winding 14 of motor 10. The sensing transformer is provided with a single secondary winding 67. An adjustable core 62, like core 42 in FIG. 1, may be provided to vary the inductive coupling between transformer windings 66 and 67. The principal control element in circuit 61 is a triac or quadrac 71 having input and output electrodes 72 and 73 and a gate electrode 74. In control circuit 61, electrode 63 is connected to conductor 21 in the power supply circuit for motor 10. This same electrode is connected to one terminal of the secondary winding 67 of sensing transformer 65. The other terminal of secondary winding 67 is connected through a pair of zener diodes 76 and 77, connected in back-to-back relationship, to the gate or trigger electrode 74.

In operation, control circuit 61 of FIG. 2 functions in a manner essentially similar to the previously described embodiment. Upon closing of switch 23, the high starting current to winding 14 of motor 10 produces a relatively high voltage across the primary winding 66 of sensing transformer 65. As a consequence, a control signal is developed across secondary winding 67 and, accordingly, applied to electrodes 73 and 74 of the semiconductor gate device, triac 71. Triac 71 is triggered to conduction and energizes starting winding 15 through the starting capacitor 29. As noted above, triac 71 is an AC device; winding 15 receives an unrectified AC current.

Subsequently, as motor 10 approaches running conditions, the control signal voltage developed across secondary winding 67 of sensing transformer 65 is materially reduced. When the voltage falls below an amplitude necessary to maintain conduction through zener diodes 76 and 77, the control signal to electrodes 73 and 74 is cut off. Consequently, triac 71 is rendered nonconductive and starting winding 15 is effectively cut out of the operating circuit. This condition obtains until such time as a heavy load on motor 10 again causes winding 14 to draw a high enough current to produce a control signal of sufficient voltage to effect conduction through the Zener diodes 76 and 77, or until the motor is stopped and again restarted.

The circuit of FIG. 2, omitting the diodes 76 and 77, has been tested with a conventional one-half horsepower 115 volt 1,750 r.p.m. squirrel-cage motor manufactured by General Electric Company, using a type SC45D triac rated at 400 volts DC as the gate device 71. The turns ratio for transformer 65 was approximately 5:1. Motor starting current was 28 amperes, full load current 8 amperes, no-load current six and one-half amperes. The voltage across the triac 71 was 5 volts at starting, 180 volts at full load. Current to starting winding 15 was 10 amperes on starting, zero at full load. The triac 71 was gated to conduction at a threshold of 24-amperes current to the main winding and went nonconductive at 22 amperes.

Figure 3:
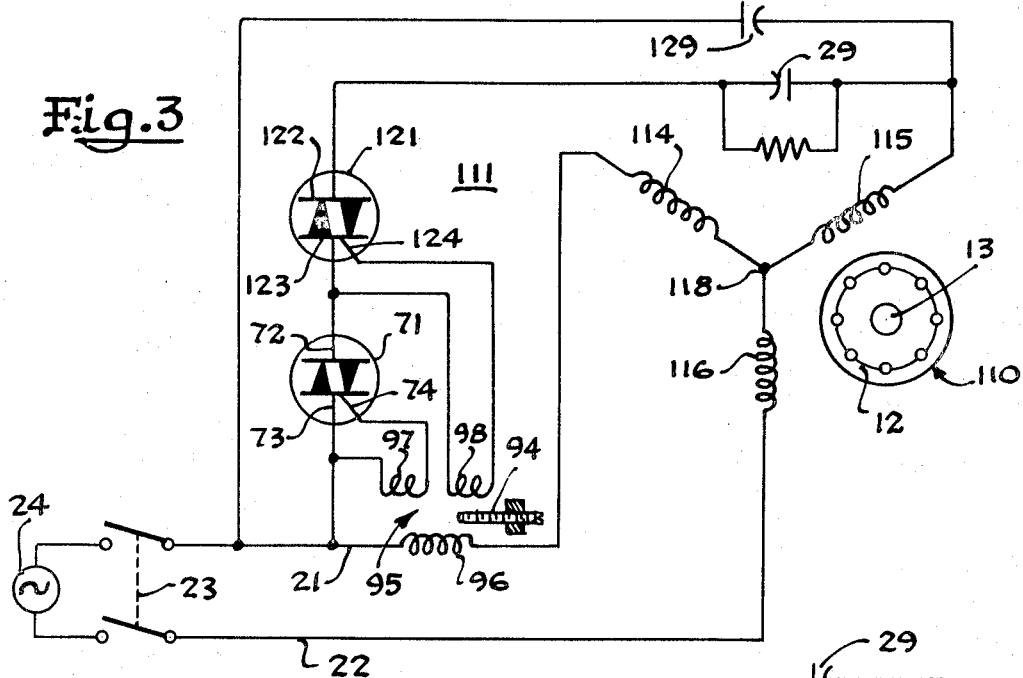
FIG. 3 is a schematic circuit diagram of a capacitor-start capacitance-run motor having three-phase windings but operated single-phase and connected in a control circuit comprising a further embodiment of the present invention.

FIG. 3 illustrates a further embodiment of the present invention in which a three-phase motor 110, operated as a single-phase motor, is controlled by a control circuit 111. Motor 110 comprises a wound rotor or a squirrel-cage motor 12 mounted upon a suitable shaft 13, the windings on the armature 12 being inductively coupled to three windings 114, 115 and 116 connected together at a common terminal 118. Windings 114 and 116, in the illustrated single-phase connection, serve as a main or running winding; winding 115 functions as a starting winding. As in FIG. 1, the running winding 114 is connected by a power circuit comprising the conductors 21 and 22 and starting switch 23 to a conventional AC source 24.

Figure 4:
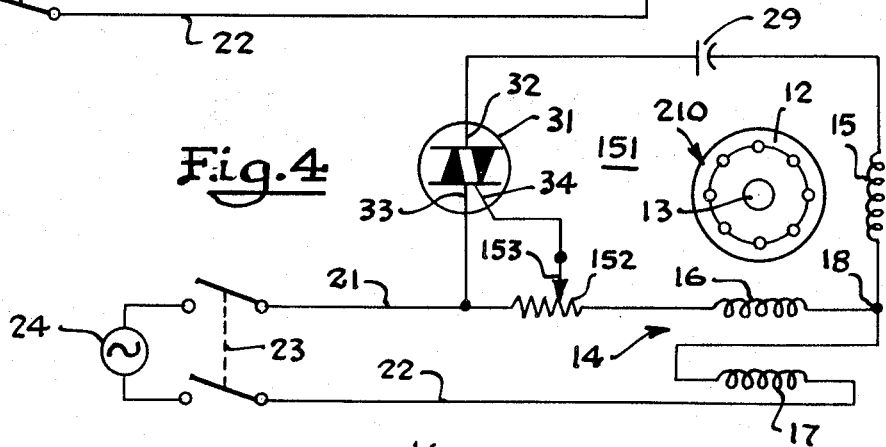
FIG. 4 is a schematic illustration of a capacitor-start inductance-run dual-voltage motor connected in a control circuit according to another embodiment of the present invention.

In FIG. 4, motor 110 is arranged for capacitor-start capacitor-run operation. An intermittent-duty starting capacitor 29 is connected in series in the control circuit 111 between the starting winding 115 of the motor and the power supply conductor 21. In addition, a continuous-duty running capacitor 129 is connected from winding 115 to conductor 21, in parallel with starting capacitor 29 and control circuit 111. The power supply connection, comprising main windings 114, 116, conductors 21 and 22, starting switch 23, and power supply 24, remains the same as in the previously described embodiments.

The control circuit for the embodiment of FIG. 3 comprises an air core sensing transformer 95 having a primary winding 96 and two concentric secondary windings 97 and 98. In this instance, the sensing transformer is provided with an adjustable iron core 94.

Control circuit 111 is similar to control circuit 61 of FIG. 2 in that it provides for use of the transformer secondary 97 to trigger a first bidirectional semiconductor rectifier 71 having input and output electrodes 72 and 73 and a gate electrode 74; the transformer secondary is connected to electrodes 73 and 74. But in circuit 111 there is also a second triac (or quadrac) 121 having input and output electrodes 122 and 123 and a gate electrode 124. The other transformer secondary 98 is connected between electrodes 123 and 124 and the two triacs are connected in series between conductor 21 and capacitor 29.

When starting switch 23 is closed in the circuit arrangement of FIG. 3, the inrush of starting current for motor 110 produces a high amplitude control signal in each of the secondary windings 97 and 98 of sensing transformer 95. The two triacs 71 and 121 are both driven to conduction, energizing winding 115 through capacitor 29 as well as capacitor 129.

As long as devices 71 and 121 remain conductive, in the embodiment of FIG. 3, starting capacitor 29 in the starting circuit for winding 15 of motor 10 is continuously connected to the power supply conductor 21. When the current to the main winding 114 drops to a predetermined level, as the motor gains speed, the current to the starting winding through capacitor 29 is cut off by the gate devices 71 and 121, which return to their normal nonconductive state. As a consequence, the starting capacitor is effective cut out of the operating circuit and motor operation continues with main windings 114 and 116 energized and with winding 115 energized only through running capacitor 129.

Specific test data for the circuit of FIG. 3, intended to be exemplary only, are given below, as applied to a one horsepower three-phase winding motor rated at 230 volts and 3,450 r.p.m. The triacs 71 and 121 were type SC45D, rated 400 volts DC.

| Operating voltages (volts) | Start | Full load |
|---|---|---|
| Line voltage | 235 | 245 |
| Winding 114 | 150 | 245 |
| Windings 115, 116 (total) | 140 | 238 |
| Primary 96 | 1.6 | 0.4 |
| Secondaries 97, 98 | 0.7 | 0.2 |
| Across triacs 71, 121 (total) | 0 | 245 |
| Total line current | 24 | 5 |
| Capacitor 29 | 10 | 0 |

FIG. 4 illustrates a control circuit 151 that is basically similar to circuit 11 (FIG. 1), applied to a dual-voltage capacitor-start inductance-run motor 210 comprising a squirrel-cage rotor 12 mounted on a shaft 13 and inductively coupled to a starting winding 15 and a running winding 14. Running winding 14 comprises two sections 16 and 17, connected together at terminal 18. The high-voltage series connection for winding sections 16,17 is shown; for low-voltage operation winding sections 16 and 17 are reconnected in parallel. The main power circuit comprising conductors 21 and 22, starting switch 23, and supply 24 is the same as in FIG. 1.

As in FIG. 1, starting winding 15 is energized through a triac, quadrac, or like bidirectional signal-controlled rectifier 31 having its input and output electrodes 32,33 connected in series from conductor 21 to the starting winding. The starting capacitor 29 is incorporated in series in this circuit.

The sensing means in control circuit 151 is a tapped resistor 152 connected in series with power line 21. The resistor tap 153 is connected to the gate electrode of triac 31. Thus, it is the voltage across the left-hand portion of resistor 152 that gates triac 31 on and off. The connection from resistor 152 to winding section 16 can be taken from tap 153 if desired. And the connections from the resistor to electrodes 33 and 34 can be reversed, as described above in connection with FIG. 1. A threaded adjustable resistor can be employed as the sensing resistor 152. Another form of sensing resistor that has been used satisfactorily is a single open loop of resistance wire with a bridging connector affording the variable tap. Operation is essentially identical to the circuit of FIG. 1.

Figure 5:
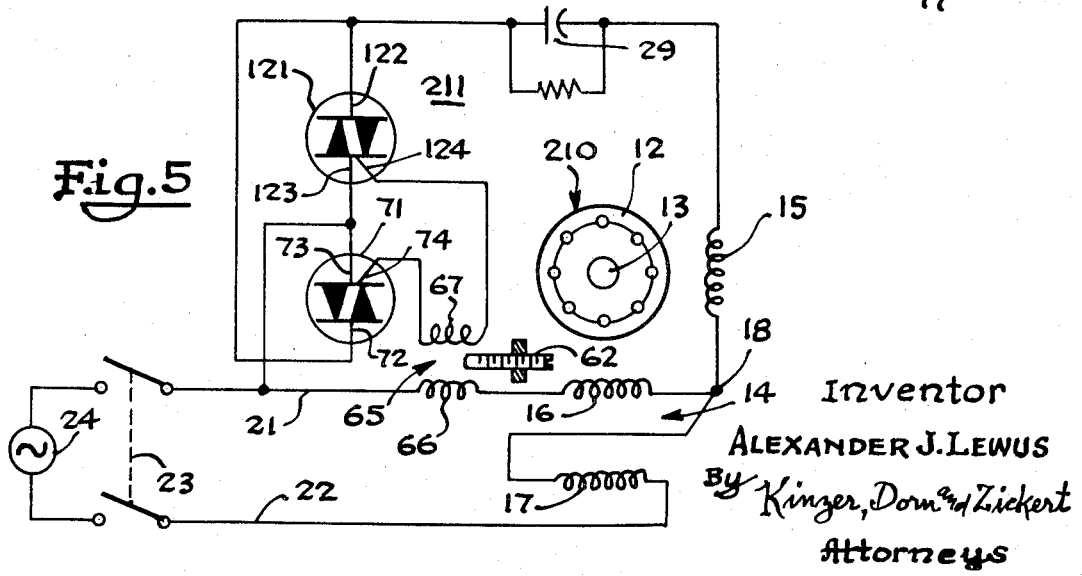
FIG. 5 illustrates a capacitor-start inductance-run dual-voltage motor connected in another control circuit according to the FIG. 6 illustrates another embodiment of the invention.

FIG. 5 illustrates a control circuit 211 that combines many of the features of FIGS. 2, 3 and 4. The motor 210 shown in FIG. 5 is a dual-voltage motor comprising a squirrel-cage armature 12 mounted upon a shaft 13 and inductively coupled to a starting winding 15 and a running winding 14. The main or running winding 14 comprises two winding sections 16 and 17 shown connected in series at terminal 18, to which starting winding 15 connects, for high-voltage operation. Of course, for low-voltage operation winding sections 16 and 17 would be reconnected in parallel with each other. The power circuit for the running winding is the same as in previously described embodiments and includes the conductors 21 and 22 connected through a starting switch 23 to a suitable power supply 24.

Control circuit 211 of FIG. 5 employs two triacs, quadracs, or similar bidirectional signal-controlled semiconductor gate devices 71 and 121. In this circuit, however, the two triacs are connected in parallel instead of employing the series connection shown in FIG. 3. Thus, the input electrodes 73 and 123 of triacs 71 and 121 are connected to the power line 21. The output electrodes 72 and 122 are connected to each other and are connected through the starting capacitor 29 to starting winding 15.

The sensing means in circuit 211 comprises an air core transformer 65 like that shown in FIG. 2, with an adjustable magnetic core 62 movable into and out of the air space encompassed by concentric primary and secondary windings 66 and 67. Primary winding 66 is connected in series with the conductor 21 in the power circuit for the motor winding 14. Secondary winding 67 of transformer 65 is connected at its opposite ends, to the gate electrodes 74 and 124 of triacs 71 and 121 respectively.

Operation of control circuit 211 is essentially similar to the circuits described above. When switch 23 is closed, the inrush of starting current to motor 210 develops a relatively high voltage across the secondary winding 67 of sensing transformer 65. This signal voltage triggers the two triacs 71 and 121 to conductive condition, energizing starting winding 15 through the two triacs, in parallel with each other, and through starting capacitor 29. As the motor speed increases and operating current is reduced, the voltage across sensing transformer secondary 67 drops below the level required to maintain conduction in the two triacs. The triacs revert to their normal nonconductive state, effectively disconnecting starting winding 15 for running conditions. Magnetic core 62 is adjusted to afford optimum operation of the circuit, establishing threshold levels appropriate to the requirements of motor 210.

The circuit of FIG. 5 has been operated in conjunction with a one horsepower capacitor-start inductance-run motor rated at 1,750 r.p.m., 230 volts, 60 cycles, and 7.2 amperes using Type SC45D triacs rated at 400 volts DC as the triacs 71 and 121. The turns ratio for transformer 65 was approximately 3.5:1. On starting, the total line current was approximately 35 amperes and the current through the primary winding 66 of sensing transformer 65 was approximately 24 amperes, the voltages across primary 66 and secondary 67 being 0.8 volts and 1.3 volts respectively. The current to starting winding 15, upon starting of the motor, was approximately 20 amperes. For running conditions, the current drawn by the motor was approximately 7.2 amperes and the current to starting winding 15 was approximately zero. The voltages across windings 66 and 67 were 0.2 and 0.5 volts, respectively. Total no-load current was approximately 6 amperes, with essentially no current to the starting winding. Starting torque was 9 foot-pounds (300 percent full load) with a pull-in torque of 7 foot-pounds and a breakdown torque of 12 foot-pounds. At starting, the voltage across the triacs was 15 volts, increasing to 180 volts running and 200 volts at no load. The circuit of FIG. 5 is particularly suitable for large low-voltage motors.

Figure 6:
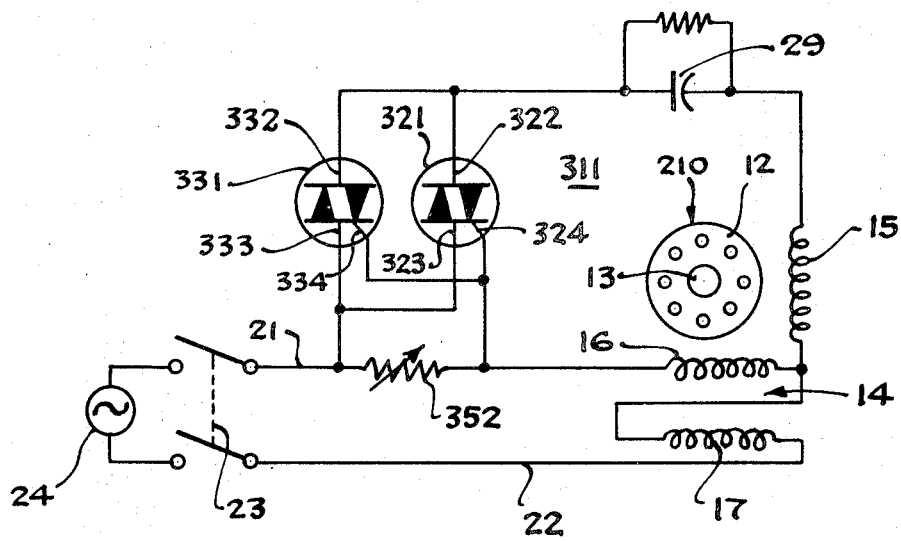

FIG. 6 shows a control circuit 311 constituting another embodiment of the present invention. The motor 210 shown in FIG. 6 is again a dual-voltage motor comprising a squirrel-cage armature 12 on a shaft 13, the armature being inductively coupled to a starting winding 15 and to a running winding 14 comprising two winding sections 16 and 17. The motor is again shown for the high-voltage connection with the running winding 15 connected to the common terminal 18 of the running winding sections 16 and 17. The power circuit again comprises the conductors 21 and 22 connected through the starting switch 23 to an appropriate AC power supply 24.

Control circuit 311 utilizes two triacs 321 and 331; quadracs or similar bidirectional signal-controlled semiconductor gate devices can be employed if desired. Moreover, the two triacs are connected in parallel, but the parallel connection is not the same as in FIG. 5.

Thus, the two input electrodes 323 and 333 of the triacs 321 and 331 are electrically connected to each other and are connected to the input line 21. The output electrodes 322 and 332 of the two triacs are electrically connected to each other and this circuit is connected to a starting capacitor 29 that is in turn connected to starting winding 15. As before, a resistor may be connected in parallel with capacitor 29.

In circuit 311, the sensing means employed to control operation of the two triacs comprises a variable resistor 352, connected in series in conductor 21. Resistor 352 may, for example, comprise a single loop of resistance wire bridged by an adjustable conductive connector. A conventional potentiometer construction can be employed for the variable resistor 352 if desired, or other appropriate variable resistor construction can be employed. In circuit 311, and in other embodiments of the invention in which a variable resistance sensing means is employed, it is preferable to utilize a resistance element having a low-temperature coefficient of resistivity. Otherwise, during operation of the control circuit, the heating of the resistor changes the triggering voltage supplied to the triacs or quadracs, for given motor currents, making it difficult to maintain accurate control of the current levels at which the starting winding of the motor is cut into and cut out of operation. Nichrome resistance wire and other resistance elements having low-temperature coefficients of resistivity are quite desirable for the resistance sensing elements in these circuits. Carbon resistors and other devices having low- or even negative-temperature coefficients can also be used.

To complete the electrical circuit for control device 311, FIG. 6, the two gate electrodes 324 and 334 of triacs 321 and 331 are electrically connected to each other and are connected to the terminal of sensing resistor 352 opposite the connection to the input electrodes for the triacs.

Operation of control circuit 311 is generally similar to control circuit 151, FIG. 4. In this instance, however, the current to starting winding 15 is divided between triacs 321 and 331, permitting the use of semiconductor switching devices of relatively low amperage rating even though the current requirements for motor 210 may be relatively high. It will be recognized that additional triac or quadrac switching devices can be incorporated in the circuit in parallel with triacs 321 and 331 to further reduce the current requirements imposed upon the switching devices when necessary, the only limitation being that the gating characteristics of the devices should all be similar. Selection of the gating level for the triacs is effected by adjustment of resistor 352. Again, the circuit of FIG. 6 is particularly advantageous for the operation of relatively large motors, making it possible to provide an effective circuit that requires only a single sensing means, the relatively inexpensive resistor 352.

A comparison of the circuit illustrated in FIG. 6, on an operational basis, with the circuit of FIG. 5, again applied to a one horsepower capacitor-start inductance-run motor rated at 230 volts, 1,750 r.p.m. and 7.2 amperes, and again using Type SC45D triacs, produces essentially the same operational data.

Figure 7:
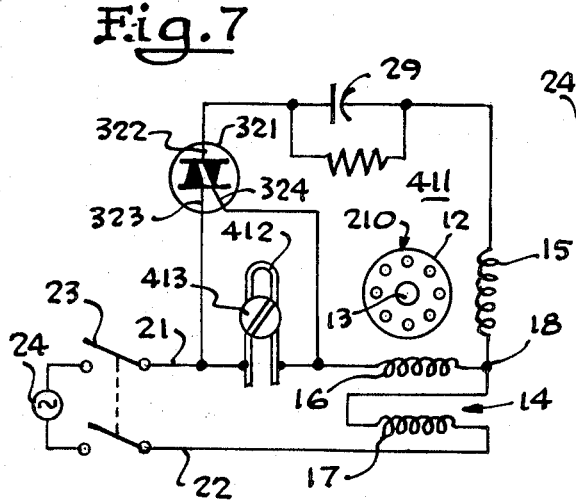
FIG. 7 shows a specific sensor for the circuit of FIG. 6.

FIG. 7 illustrates a control circuit 411 that corresponds to circuit 311 of FIG. 6 but includes the preferred form of sensing resistance described above. As before, the motor 210 is a dual-voltage motor comprising a squirrel-cage armature 12 on a shaft 13, the armature being inductively coupled to a running winding 14 comprising two sections 16 and 17 and to a starting winding 15. The power circuit comprises the conductors 21 and 22 connected through the starting switch 23 to the AC power supply 24.

Control circuit 411 includes a triac, quadrac, or like semiconductor gate device 321 having its input electrode 323 connected to power line 21. The output electrode 322 of triac 321 is connected to a starting capacitor 29 that is in turn connected to starting winding 15. A resistor may be connected in parallel with capacitor 29.

In circuit 411, the sensing means for controlling operation of triac 321 comprises a single loop 412 of resistance wire that is connected in series in the power line 21. An adjustable conductive connector 413 bridges the resistance wire loop 421; connector 413 can be moved along loop 421 to vary the effective resistance connected in series in line 21. Preferably, loop 421 is constructed of Nichrome resistance wire or other resistor material having a low-temperature coefficient of resistivity. As shown in FIG. 7, the control electrode 324 of triac 321 is connected to the power lines 21 on the side of resistance loop 412 opposite the connection made from line 21 to the input electrode 323 of the triac.

The construction illustrated in FIG. 7 affords an inexpensive yet highly effective means for controlling operation of triac 321. Using a resistance element 412 having a low-temperature coefficient of resistivity, the voltage across the resistor for a given motor current does not change appreciably with heating of the motor in the course of protracted use or with changes in ambient temperature. Consequently, control circuit 411 switches the starting winding 15 in and out of the operating circuit of the motor in a uniform manner regardless of environmental conditions. This provides materially increased repeatability in the motor operation as compared with other more complex sensing devices for actuation of the semiconductor switch. As noted in connection with the description of FIG. 6, carbon resistors and other devices having low- or even negative-thermal coefficients of resistivity are also quite practical, using the simple construction and adjustment arrangement shown in FIG. 7. As in the case of FIG. 6, additional triac or quadrac switching devices can be incorporated in the circuit in parallel with devices 312 to avoid overloading of the semiconductor switching device when the circuit is applied to relatively large motors.

Figure 8:
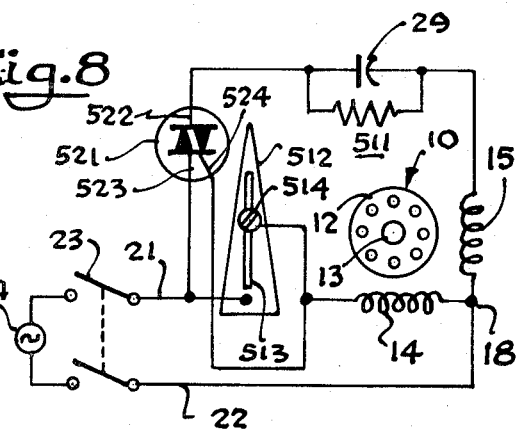
FIG. 8 illustrates an additional embodiment of the invention.

FIG. 8 illustrates a control circuit 511 constituting another embodiment of the invention as applied to the control of motor 10 having an armature 12 mounted on a shaft 13. The starting winding 15 and the running winding 14 of motor 10 are connected together at a common terminal 18. The power circuit again comprises the conductors 21 and 22 connected through the starting switch 23 to an AC supply 24, with conductor 22 being connected to terminal 18.

Control circuit 511 includes a triac, quadrac, or similar bidirectionally conductive gate device 521 having an input electrode 523 connected directly to power supply conductor 21. The output electrode 522 of triac 521 is connected to a capacitor 29 that is in turn connected to starting winding 15 of motor 10. As before, a resistor may be connected in parallel with capacitor 29.

The sensing means for control of triac 521, in circuit 511, comprises a tapered resistor member 512 having a central slot 513. The broad end or base of resistor member 512 is electrically connected to the power lead 21. A conductive connector 514 is mounted in slot 513 and can be positioned any desired point along the slot. Connector 514 is electrically connected to running winding 14 and is also electrically connected to the control electrode 524 of triac 521. It is thus seen that resistor 512, electrically speaking, is a simple potentiometer with the tap on the potentiometer connected to the running winding of the motor and to the control electrode of the triac.

The basic operation of control circuit 511, FIG. 8, is essentially similar to that described above in connection with FIGS. 4, 6 and 7. The initial inrush current to starting winding 14, when switch 23 is closed, produces a substantial voltage drop across the sensing resistor 512 and this voltage triggers triac 521 to conduction. As motor 10 gains in speed and the line current reduces, the effective drop across resistor 512 is reduced, reaching a point at which the voltage is insufficient to trigger triac 521 to conduction. When this occurs, the starting winding 15 and capacitor 29 are effectively cut out of the operating circuit. The tapered resistance construction employed for resistor 512 is of substantial advantage in maintaining a relatively constant temperature in any adjustment of connector 514. The best characteristics are obtained if resistor 512 is formed of Nichrome or other resistance alloy having a low-temperature coefficient of resistivity; alternatively, the resistor element may be a fabricated carbon resistor.

In the various forms of dual-voltage motor illustrated above, it is important to note that it is not necessary to change the sensing means employed to actuate the triacs, quadracs, or like semiconductor gating devices when the motor is changed between high-voltage and low-voltage operation. Thus, referring to FIGS. 6 and 7, if the running winding sections 16 and 17 are reconnected in parallel in conventional manner for low-voltage operation it is seen that adjustable resistor 352 is effectively reconnected in series with both running winding sections. Under these circumstances, it is not necessary to make any substantial readjustment of the sensing resistor, assuming that the current characteristics of the motor remain substantially the same for low-voltage operation as for high-voltage operation, which is usually the case. Thus, control circuit 311, and other dual-voltage control circuits constructed in accordance with the invention do not require replacement or substantial modification of any of the circuit components when a change is made from operation at one voltage level to another.

It will be apparent that additional variations of the invention can be readily accomplished by combining the features of different circuits illustrated above. For example, the series connection for two triacs illustrated in FIG. 3 can be employed with a sensing transformer having a single secondary winding connected to the control electrodes of the triacs in the manner shown in FIG. 5, affording a circuit particularly suitable for large high-voltage motors. Any of the circuits illustrated in conjunction with capacitor-start inductance-run operation can be used without substantial modification for either split-phase motors or capacitor-start capacitor-run motors. By the same token, circuits shown for split-phase operation can be used equally well for either type of capacitor operation and the capacitor-start capacitor-run circuit arrangements are readily adaptable to either split-phase or induction-run operation. All of the control circuits afford very sensitive control for the switching level of the starting windings, a sensitivity that cannot be achieved if substantial impedance is incorporated in the trigger circuits.

All of the embodiments of the present invention as described above eliminate any requirement for mechanical switching devices, thereby avoiding any maintenance difficulties due to contact arcing and to fouling or other failure of the switches. The speed of response of these circuits is much higher than afforded by either relays or centrifugal switches. Any of the circuit arrangements may be easily and conveniently arranged for reversal of rotation of the motor under load conditions. Moreover, these control circuits may be constructed to afford better pull-in and breakdown torque characteristics, for a given motor, than may be conveniently achieved with more conventional circuits.

I claim:

1. A control circuit for a single-phase electric motor of the split-phase or capacitor-start kinds, including a main winding and a starting winding angularly displaced from each other in a stator core and inductively coupled to a rotor, comprising:
   power circuit means for connecting said main winding to a single-phase power supply;
   sensing means, coupled to said power circuit means, for developing a control signal proportional to the load current to the main winding of the motor;
   starting circuit means, for connecting said starting winding to the power supply;
   a unitary signal-controlled bidirectionally conductive semiconductor gate device, having input and output electrodes connected in series in said starting circuit means, and having a gate electrode directly conductively connected to said sensing means, without substantial impedance, for closing said starting circuit means in response to said control signal whenever the load current to said main winding exceeds a first threshold amplitude and for opening said starting circuit means whenever the motor load current falls below a second threshold amplitude; and
   said sensing means comprising an air core inductance coil connected in series in said power circuit means and having its terminals connected to the input and gate electrodes, respectively, of said gate device.

2. A control circuit for a single-phase electric motor according to claim 1, and further comprising a magnetic core adjustably movable into and out of said inductance coil to vary said threshold amplitudes.

3. A control circuit for a single-phase electric motor of the split-phase or capacitor-start kinds, including a main winding and a starting winding angularly displaced from each other in a stator core and inductively coupled to a rotor, comprising:
   power circuit means for connecting said main winding to a single-phase power supply;
   sensing means, coupled to said power circuit means, for developing a control signal proportional to the load current to the main winding of the motor;
   starting circuit means, for connecting said starting winding to the power supply;
   a unitary signal-controlled bidirectionally conductive semiconductor gate device, having input and output electrodes connected in series in said starting circuit means, and having a gate electrode directly conductively connected to said sensing means, without substantial impedance, for closing said starting circuit means in response to said control signal whenever the load current to said main winding exceeds a first threshold amplitude and for opening said starting circuit means whenever the motor load current falls below a second threshold amplitude; and
   a pair of Zener diodes connected back to back in series with said gate electrode to determine said threshold amplitudes independently of the operating characteristics of said gate device.

4. A control circuit for a single-phase electric motor of the split-phase or capacitor-start kinds, including a main winding and a starting winding angularly displaced from each other in a stator core and inductively coupled to a rotor, comprising:
   power circuit means for connecting said main winding to a single-phase power supply;
   sensing means, coupled to said power circuit means, for developing a control signal proportional to the load current to the main winding of the motor;
   starting circuit means, for connecting said starting winding to the power supply;
   a unitary signal-controlled bidirectionally conductive semiconductor gate device, having input and output electrodes connected in series in said starting circuit means, and having a gate electrode directly conductively connected to said sensing means, without substantial impedance, for closing said starting circuit means in response to said control signal whenever the load current to said main winding exceeds a first threshold amplitude and for opening said starting circuit means whenever the motor load current falls below a second threshold amplitude;
   said sensing means comprising an air core transformer including a primary winding connected in series in one line of said power circuit and a secondary winding having one terminal connected to said input electrode and to said one line of said power circuit and having another terminal connected to said gate electrode; and
   a magnetic core adjustably movable into and out of said transformer to vary said threshold amplitudes.

5. A control circuit for a single-phase electric motor of the split-phase or capacitor-start kinds, including a main winding and a starting winding angularly displaced from each other in a stator core and inductively coupled to a rotor, comprising:
   power circuit means for connecting said main winding to a single-phase power supply;
   sensing means, coupled to said power circuit means, for developing a control signal proportional to the load current to the main winding of the motor;
   starting circuit means, for connecting said starting winding to the power supply;
   a pair of unitary signal-controlled bidirectionally conductive semiconductor gate devices, each having input and output electrodes connected in series in said starting circuit means, and each having a gate electrode directly conductively connected to said sensing means, without substantial impedance, for closing said starting circuit means in response to said control signal whenever the load current to said main winding exceeds a first threshold amplitude and for opening said starting circuit means whenever the motor load current falls below a second threshold amplitude;
   said sensing means comprising an air core transformer including a primary winding connected in series in one line of said power circuit and a secondary winding connected at its opposite ends to the respective gate electrodes of said gate devices; and
   a magnetic core adjustably movable into and out of said transformer to vary said threshold amplitudes.

6. A control circuit for a single-phase electric motor according to claim 5 in which said gate devices are connected in parallel with each other for use with a large low-voltage motor.

7. A control circuit for a single-phase electric motor according to claim 5 in which said gate devices are connected in series with each other for use with a large high-voltage motor.

8. A control circuit for a single-phase electric motor of the split-phase or capacitor-start kinds, including a main winding and a starting winding angularly displaced from each other in a stator core and inductively coupled to a rotor, comprising:
   power circuit means for connecting said main winding to a single-phase power supply;
   sensing means, coupled to said power circuit means, for developing a control signal proportional to the load current to the main winding of the motor;
   starting circuit means, for connecting said starting winding to the power supply;
   a pair of unitary signal-controlled bidirectionally conductive semiconductor gate devices, each having input and output electrodes connected in series in said starting circuit means, said devices being in series with each other, and each having a gate electrode directly conductively connected to said sensing means, without substantial impedance, for closing said starting circuit means in response to said control signal whenever the load current to said main winding exceeds a first threshold amplitude and for opening said starting circuit means whenever the motor load current falls below a second threshold amplitude;

said sensing means comprising an air core transformer including a primary winding connected in series in one line of said power circuit and two secondary windings, each secondary winding having one terminal connected to the input electrode and the opposite terminal connected to the gate electrode of a respective one of said gate devices; and a magnetic core adjustably movable into and out of said transformer to vary said threshold amplitudes.

9. A control circuit for a single-phase electric motor of the split-phase or capacitor-start kinds, including a main winding and a starting winding angularly displaced from each other in a stator core and inductively coupled to a rotor, comprising:

power circuit means for connecting said main winding to a single-phase power supply;

sensing means, coupled to said power circuit means, for developing a control signal proportional to the load current to the main winding of the motor;

starting circuit means, for connecting said starting winding to the power supply;

a unitary signal-controlled bidirectionally conductive semiconductor gate device, having input and output electrodes connected in series in said starting circuit means, and having a gate electrode directly conductively connected to said sensing means, without substantial impedance, for closing said starting circuit means in response to said control signal whenever the load current to said main winding exceeds a first threshold amplitude and for opening said starting circuit means whenever the motor load current falls below a second threshold amplitude; and said sensing means comprising a resistor having two end terminals connected to said gate device input electrode and to said main winding, respectively, and having a movable tap terminal connected to said gate electrode.

10. A control circuit for a single-phase electric motor according to claim 9 in which said resistor has a low-temperature coefficient of resistivity.

11. A control circuit for a single-phase electric motor of the split-phase or capacitor-start kinds, including a main winding and a starting winding angularly displaced from each other in a stator core and inductively coupled to a rotor, comprising:

power circuit means for connecting said main winding to a single-phase power supply;

sensing means, coupled to said power circuit means, for developing a control signal proportional to the load current to the main winding of the motor;

starting circuit means, for connecting said starting winding to the power supply;

a unitary signal-controlled bidirectionally conductive semiconductor gate device, having input and output electrodes connected in series in said starting circuit means, and having a gate electrode directly conductively connected to said sensing means, without substantial impedance, for closing said starting circuit means in response to said control signal whenever the load current to said main winding exceeds a first threshold amplitude and for opening said starting circuit means whenever the motor load current falls below a second threshold amplitude; and said sensing means consisting essentially of a resistance connected in series with said power circuit means and said main winding, the value of said resistance being selected to establish said threshold amplitudes.

12. A control circuit for a single-phase electric motor according to claim 11 in which said resistance comprises a single effective loop of resistance material bridged by an adjustable conductive connector, and the terminal of said resistance connected to said gate electrode is also connected to said main winding.

13. A control circuit for a single-phase electric motor according to claim 11 in which said resistance comprises a resistor element having a tap terminal adjustably movable therealong, and said tap terminal is connected both to said gate electrode and to said main winding.

14. A control circuit for a single-phase electric motor according to claim 13 in which said resistance is of tapered construction from the low-impedance end to the high-impedance end thereof.

15. A control circuit for a single-phase electric motor according to claim 10 in which said resistance is formed from a material having a low-temperature coefficient of resistivity.